(12) United States Patent
Noguchi et al.

(10) Patent No.: US 7,394,517 B2
(45) Date of Patent: Jul. 1, 2008

(54) LIQUID CRYSTAL PANEL

(75) Inventors: Koji Noguchi, Kanagawa (JP); Shuichi Tatemori, Kanagawa (JP); Osamu Ishige, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/757,610

(22) Filed: Jan. 14, 2004

(65) Prior Publication Data

US 2004/0145693 A1    Jul. 29, 2004

(30) Foreign Application Priority Data

Jan. 17, 2003    (JP)    ............................. P2003-009093

(51) Int. Cl.
    *G02F 1/1339*    (2006.01)
(52) U.S. Cl. ........................ 349/156; 349/155; 349/134; 349/136
(58) Field of Classification Search ......... 349/155–156, 349/134, 136
    See application file for complete search history.

(56) References Cited

U.S. PATENT DOCUMENTS

| | | | | |
|---|---|---|---|---|
| 5,877,836 A | * | 3/1999 | Miura et al. | ................. 349/184 |
| 6,211,937 B1 | * | 4/2001 | Miyachi et al. | ............. 349/156 |
| 6,788,372 B1 | * | 9/2004 | Kaise et al. | .................. 349/122 |
| 6,853,421 B2 | * | 2/2005 | Sakamoto et al. | ........... 349/114 |
| 6,897,923 B2 | * | 5/2005 | Kanesaka et al. | ............ 349/155 |
| 2002/0075441 A1 | * | 6/2002 | Fujimori et al. | ............. 349/155 |

FOREIGN PATENT DOCUMENTS

| | | |
|---|---|---|
| JP | 7-181497 | 7/1995 |
| JP | 2001-235728 | 8/2001 |
| JP | 2002-229048 | 8/2002 |
| JP | 2002-244135 | 8/2002 |

OTHER PUBLICATIONS

Office Action for Japanese Application No. 2003-009093 filed Apr. 2, 2007.

* cited by examiner

*Primary Examiner*—David Nelms
*Assistant Examiner*—Phu Vu
(74) *Attorney, Agent, or Firm*—Sonnenschein Nath & Rosenthal LLP

(57) ABSTRACT

A liquid crystal panel including a driving substrate and a counter substrate, the two substrates having a liquid crystal layer interposed therebetween. The driving substrate has pixel electrodes and transistors connected to the pixel electrodes on a surface thereof, which are covered with an alignment film. The counter substrate is provided adjacent to the alignment film of the driving substrate. The alignment film is rubbed in a direction substantially parallel to signal lines or scanning lines connected to the transistors. Each of the pixels has a projection at a substantially central position in a direction perpendicular to the rubbing direction.

5 Claims, 6 Drawing Sheets

LIQUID CRYSTAL PANEL

RELATED APPLICATION DATA

The present application claims priority to Japanese Application No. P2003-009093 filed Jan. 17, 2003, which application is incorporated herein by reference to the extent permitted by law.

BACKGROUND OF THE INVENTION

The present invention relates to a liquid crystal panel, and particularly to an active matrix liquid crystal panel.

A typical active matrix liquid crystal panel includes transistors for driving pixel electrodes, a driving substrate having the transistors thereon, and a counter substrate having a counter electrode thereon, such that the two substrates have a liquid crystal layer interposed therebetween. FIG. 5 is a schematic plan view of a typical active matrix liquid crystal panel. Referring to FIG. 5, the liquid crystal panel 1 includes a driving substrate 11 and scanning lines 13 and signal lines 15 on the display surface of its driving substrate 11, such that the lines 13 and the lines 15 are provided perpendicular to each other. The scanning lines 13 and the signal lines 15, intersecting each other, form an array of pixels 16. Each of the pixels 16 includes a transistor 17 having a gate connected to the corresponding scanning line 13 and a source and a drain connected to the corresponding signal line 15 and a pixel electrode 19. The driving substrate 11 also has an alignment film (not shown in FIG. 5) covering the components on the substrate 11.

In the liquid crystal panel 1 provided with the driving substrate 11 described above, the scanning lines 13 and the signal lines 15 are provided adjacent to the pixel electrodes 19. This structure generates transverse electric fields between the scanning lines 13 and the pixel electrodes 19 and between the signal lines 15 and the pixel electrodes 19. These transverse electric fields consequently cause local irregular orientation of liquid crystal molecules in the liquid crystal layer over the pixel electrodes 19. It is known that light leaks in these regions where the liquid crystal molecules are oriented irregularly (referred to as reverse-tilt domains). The reverse-tilt domains parallel to the signal lines 15 and the scanning lines 13 are indicated by d1 and d2, respectively, in FIG. 5.

Referring now to FIG. 6, Japanese laid-open Patent Application Publication No. 2002-40455 discloses a liquid crystal panel 2, in which the aforementioned alignment film is rubbed in a rubbing direction x substantially parallel to the signal lines 15, thus preventing irregular orientation of liquid crystal molecules in the liquid crystal layer caused by transverse electric fields between the signal lines 15 and the pixel electrodes 19, and therefore preventing reverse-tilt domains d1 parallel to the signal lines 15.

However, the liquid crystal panel 2, which is capable of preventing reverse-tilt domains d1 parallel to the signal lines 15 as described above, is not effective in preventing reverse-tilt domains d2 parallel to the scanning lines 13. For this reason, the reverse-tilt domain d2 parallel to each of the scanning lines 13 is light-shielded with a mask provided around the corresponding pixel 16.

It is also known that, in a typical liquid crystal panel, an external force applied to the panel surface such as pressing the panel surface causes the liquid crystal layer underneath the panel surface to flow, and consequently, the associated reverse-tilt domains move according to the flow. In the liquid crystal panel 2 in FIG. 6, for example, pressing the panel surface causes the liquid crystal layer to flow. The reverse-tilt domain d2 generated along each of the scanning lines 13 moves toward the center of the pixel 16 in the rubbing direction x. As a result of this phenomenon, each of the reverse-tilt domains d2 moves toward the center of the pixel 16 where light-shielding is not provided. Thus, light easily leaks in such a non-shielded display area, i.e., the center of each pixel 16. Furthermore, a reverse-tilt domain which has moved to the display area remains there for several seconds even after the pressure to the panel surface has been released. As a result, this light leakage is easily noticeable, contributing to degradation of the display performance of the liquid crystal panel.

In particular, for a liquid crystal panel used in a display device with a touch panel, pressing the panel surface is unavoidable. In such a display device, light leakage caused by this press onto the panel surface is the greatest factor contributing to the degradation of the display performance.

SUMMARY OF THE INVENTION

Accordingly, an object of the present invention is to provide a liquid crystal panel capable of reducing light leakage to such a level that it is not noticeable, thereby maintaining superior display characteristics.

The present invention is associated with a liquid crystal panel which includes a driving substrate and a counter substrate. The driving substrate has pixel electrodes and transistors connected to the pixel electrodes on a surface thereof, which are covered with an alignment film. The counter substrate is provided adjacent to the alignment film on the driving substrate. The driving substrate and the counter substrate have a liquid crystal layer interposed therebetween. The alignment film is rubbed in a direction substantially parallel to signal lines or scanning lines connected to the transistors underneath the alignment film.

The foregoing liquid crystal panel prevents irregular orientation of liquid crystal molecules caused by transverse electric fields between the pixel electrodes and either the signal lines or the scanning lines, which are parallel to the rubbing direction.

According to a first aspect of the present invention, each of the pixels in the foregoing liquid crystal panel has a projection at a substantially central position in a direction perpendicular to the rubbing direction. The liquid crystal molecules are oriented irregularly (reverse-tilt domains) may be generated by transverse electric fields between the pixel electrodes and the scanning lines or the signal lines perpendicular to the rubbing direction and may move toward the center of each pixel in the rubbing direction along with the flow of the liquid crystal layer. In this case, these projections split the reverse-tilt domains which have moved in the rubbing direction. Thus, light leakage is reduced to a low level.

According to a second aspect of the present invention, the alignment film is controlled so that the liquid crystal molecules of the liquid crystal layer have a pre-tilt angle of 4° to 20°. A pre-tilt angle of 4° or more reduces the movement of the reverse-tilt domains in the rubbing direction, along with the flow of the liquid crystal layer. As with the first aspect, light leakage from the reverse-tilt domains in the display areas is reduced. A pre-tilt angle of 20° or less suppresses retardation streaks specific to the rubbing method.

According to a third aspect of the present invention, each of the pixels has a reflective display portion and a transmissive display portion provided in that order in the rubbing direction. The light leakage caused of the reverse-tilt domain is noticeable in transmissive display portions of the pixel electrodes. Even if reverse-tilt domains as described above are generated and move in the rubbing direction along with the flow of the liquid crystal layer, it is difficult for the reverse-tilt domains to reach the transmissive display portions. The light leakage from the reverse-tilt domains in the display areas is reduced.

According to a fourth aspect of the present invention, walls extend along the borders between adjacent pixels in the direction substantially perpendicular to the rubbing direction in order to prevent flow of the liquid crystal layer. These walls prevent the liquid crystal layer from flowing in the rubbing direction. This means that even if reverse-tilt domains as described above are generated, the reverse-tilt domains do not move in the rubbing direction. It is difficult for the reverse-tilt domains to reach the center (display area) of each pixel. Thus, light leakage from the reverse-tilt domains in the display areas is reduced.

According to the first through fourth aspects of the present invention, reverse-tilt domains as described above are prevented from occurring in the liquid crystal panel. Even if such reverse-tilt domains are generated, light leakage from the reverse-tilt domains is reduced as much as possible. Thus, the liquid crystal panel offers superior display characteristics. These advantages are also effective in a display device with a touch panel including the liquid crystal panel.

DESCRIPTION OF THE PREFERRED EMBODIMENTS

Figure 6:
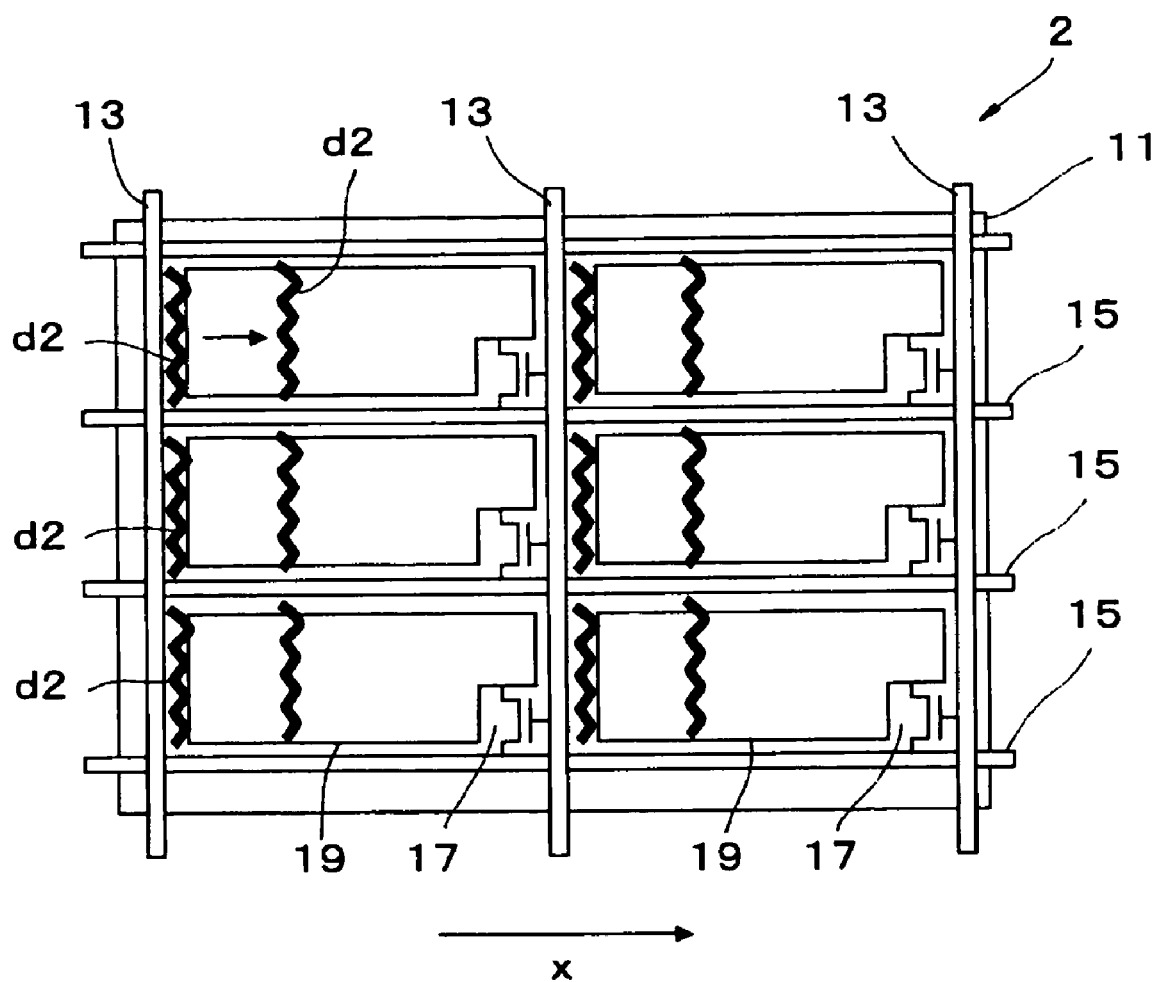
FIG. 6 is another schematic plan view of a conventional liquid crystal panel.

Preferred embodiments of a liquid crystal panel according to the present invention will be described with reference to the attached drawings. The reference numbers and symbols in each of the embodiments described below refer to the same components as those with the same reference numbers and symbols in FIG. 6.

First Embodiment

Figure 1A:
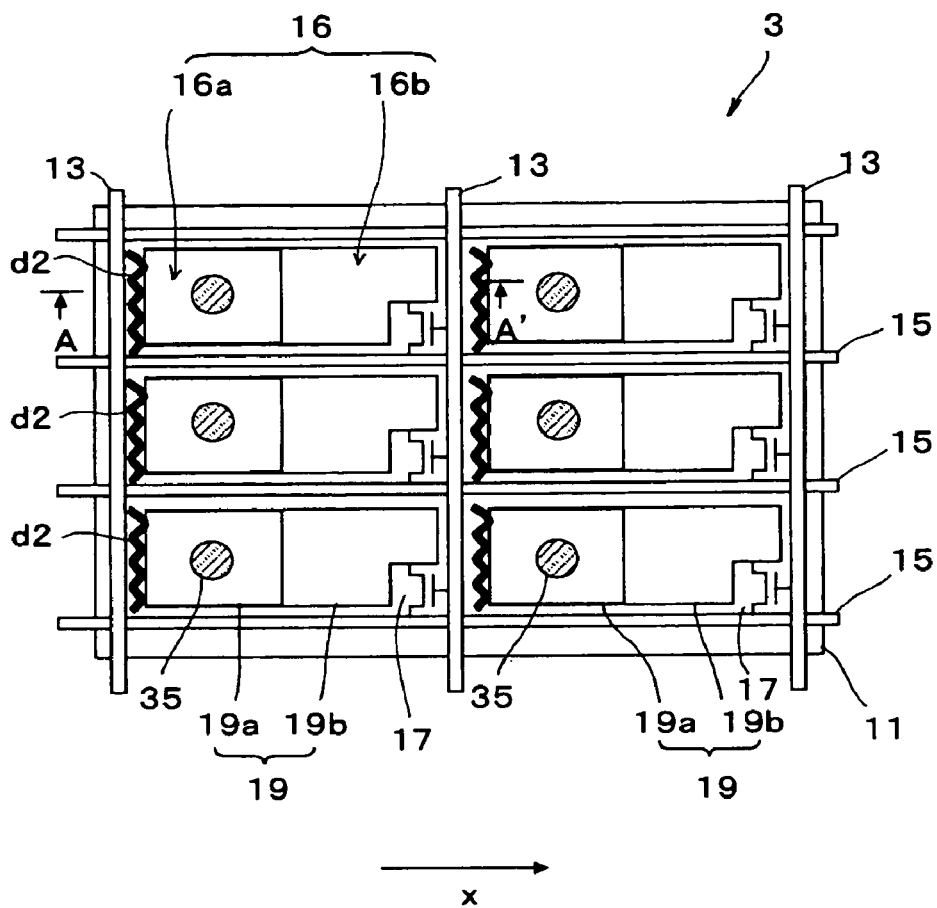
FIGS. 1A and 1B are schematic views of a liquid crystal panel according to a first embodiment of the present invention.
Figure 1B:
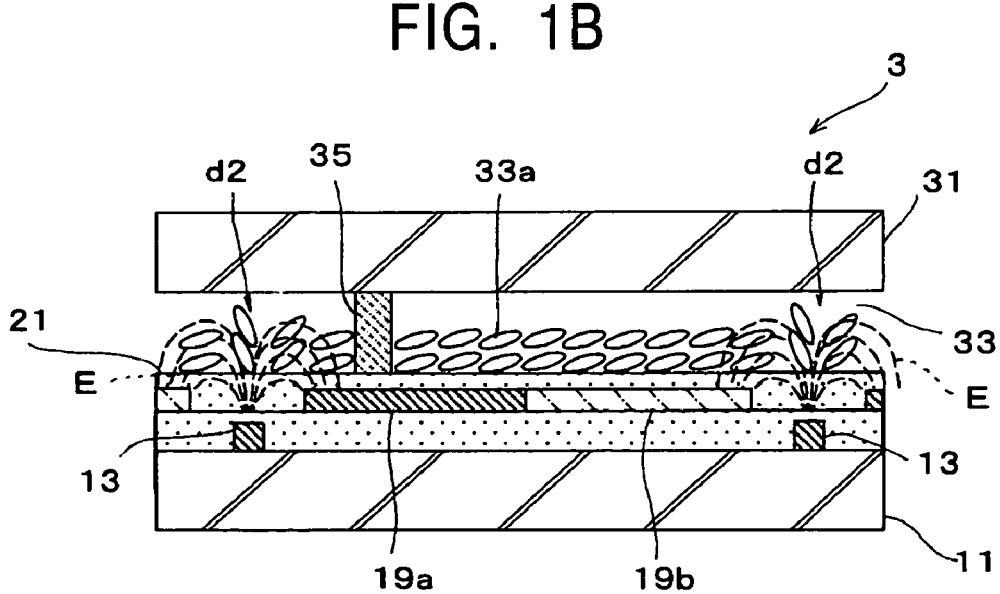

FIGS. 1A and 1B show display areas of a liquid crystal panel 3 according to a first embodiment of the present invention. FIG. 1A is a schematic plan view of a driving substrate 11 provided on the liquid crystal panel 3. FIG. 1B is a schematic sectional view of the liquid crystal panel 3, taken along line A-A' in FIG. 1A.

Referring to FIG. 1B, the liquid crystal panel 3 according to the first embodiment includes the driving substrate 11 and a counter substrate 31, the substrate 11 and the substrate 13 having a liquid crystal layer 33 interposed therebetween. Referring now to FIG. 1A, the driving substrate 11 has scanning lines 13 and signal lines 15 provided perpendicular to each other on its display surface. The scanning lines 13 and the signal lines 15, intersecting each other, form an array of pixels 16. Each of the pixels 16 includes a transistor 17. The transistor 17 comprises a gate connected to the corresponding scanning line 13, a source, and a drain connected to the corresponding signal line 15 and a pixel electrode 19. The driving substrate 11 also has an alignment film 21 thereon, as shown in FIG. 1B, which covers the components on the substrate 11.

Referring again to FIG. 1A, the display area at the center of each pixel 16 3 has a reflective display portion 16a and a transmissive display portion 16b The display area occupying a major part of the pixel 16. That is, the liquid crystal panel 3 is a half-reflective, half-transmissive liquid crystal panel. Thus, the pixel electrode 19 in each pixel 16 includes two components: a reflective electrode component 19a is provided in the reflective display portions 16a and a transmissive electrode component 19b is provide in the transmissive display portions 16b. As shown in FIG. 1B, the reflective electrode component 19a and the transmissive electrode component 19b are arranged in the same layer. These electrode components 19a and 19b may be arranged in different layers.

The reflective display portion 16a and the transmissive display portion 16b in each of the pixels 16 are arranged in that order in a rubbing direction x (a direction in which the alignment film 21 covering the upper surface of the driving substrate 11, as shown in FIG. 1B, is rubbed). It is noted that the left half portion in each pixel 16 in FIG. 1A (portion toward the start in the rubbing direction x) is required to include only a reflective display portion 16a, whereas the right half portion in each pixel 16 in FIG. 1A (portion toward the end in the rubbing direction x) may include a transmissive display portion 16b and a reflective display portion 16a.

The alignment film 21 is rubbed in the rubbing direction x substantially parallel to the signal lines 15, the rubbing direction x may be substantially parallel to the scanning lines 13. In this case, the signal lines 15 and the scanning lines 13 are exchanged in the interpretation of the description below. If the pixels 16 are rectangular, the rubbing direction x is preferably parallel to the long sides of the pixels 16.

In addition, the alignment film 21 is controlled so that the pre-tilt angle θ of the liquid crystal molecules 33a constituting the liquid crystal layer 33 ranges from 4° to 20°. For example, this adjustment is performed by setting the thickness of the alignment film 21. SE7794 manufactured by Nissan Chemical Industries, Ltd. is deposited to a predetermined thickness by means of print processing to form the alignment film 21, which is then rubbed with a cotton cloth, the pre-tilt angle θ is controlled to have the following specific values: pre-tilt angle θ=3° for a deposited film with a thickness of 30 nm, pre-tilt angle θ0=4° for a deposited film with a thickness of 40 nm, and pre-tilt angle θ=5° for a deposited film with a thickness of 50 nm. The pre-tilt angle θ here is the average of the measurements over the transmissive portion. The measurements are performed by a crystal rotation method using a model PAS301 manufactured by ELISICON.

Each of the pixels 16 has a projection 35. The projection 35 is provided at a substantially central position in the direction perpendicular to the rubbing direction x in each pixel 16. Furthermore, the projection 35 is provided at a position between the start and center in the rubbing direction x, the position excluding the center. In more detail, the projection 35 is preferably provided on the reflective electrode component 19a and near the scanning line 13 in each pixel 16. The projection 35 should be provided, in each pixel 16, as close as possible to the scanning line 13 while still preventing the reverse-tilt domain d2 caused by the transverse electric field between the reflective electrode component 19a and the scanning line 13 from moving toward the center of the pixel 16.

As shown in FIG. 1B, these projections 35 may be arranged at a height so as to serve as a spacer between the driving substrate 11 and the counter substrate 31. The projections 35 may be lower than the height needed to serve as a spacer, but must be high enough to receive the effect from the electric fields between the scanning lines 13 and the reflective electrode components 19a. In this case, another spacer is required.

These projections 35 are arranged above or underneath the alignment film 21. Normally, the projections 35 are arranged underneath the alignment film 21, i.e., the surfaces of the projections 35 are covered with the alignment film 21. In this case, the projections 35 are formed of resist patterns (for example, a negative resist Optomer NN700G manufactured by JSR Corporation) by lithography over the driving substrate 11, the upper surface of which is then covered with the alignment film 21.

Referring to FIGS. 1A and 1B, one projection 35 is arranged in each pixel 16. However, two or more projections 35 may be arranged in each pixel 16. In this case, it is effective to arrange the two or more projections 35 so that they do not overlap each other along the rubbing direction x in each pixel 16. The layout, the material, and the number of projections 35 in each pixel 16 may be determined freely as long as display characteristics of the liquid crystal panel 3 are not adversely affected.

Although not shown in FIGS. 1A and 1B, the liquid crystal panel 3 has other elements in addition to the elements described above, as for a conventional liquid crystal panel; the counter substrate 31 has a counter electrode on its surface facing the driving substrate 11, the counter electrode is covered with another alignment film, the display surface of the driving substrate 11 is provided with light-shielding masks along the scanning lines 13 and the signal lines 15, etc. The light-shielding masks may be provided on the inner surface of driving substrate 11 or the counter substrate 31.

In the liquid crystal panel 3 described above, the rubbing direction x, in which the alignment film 21 on the driving substrate 11 is rubbed, is parallel to the signal lines 15. It prevents irregular orientation of liquid crystal molecules 33a caused by the transverse electric fields between the pixel electrodes 19 and the signal lines 15.

Figure 2:
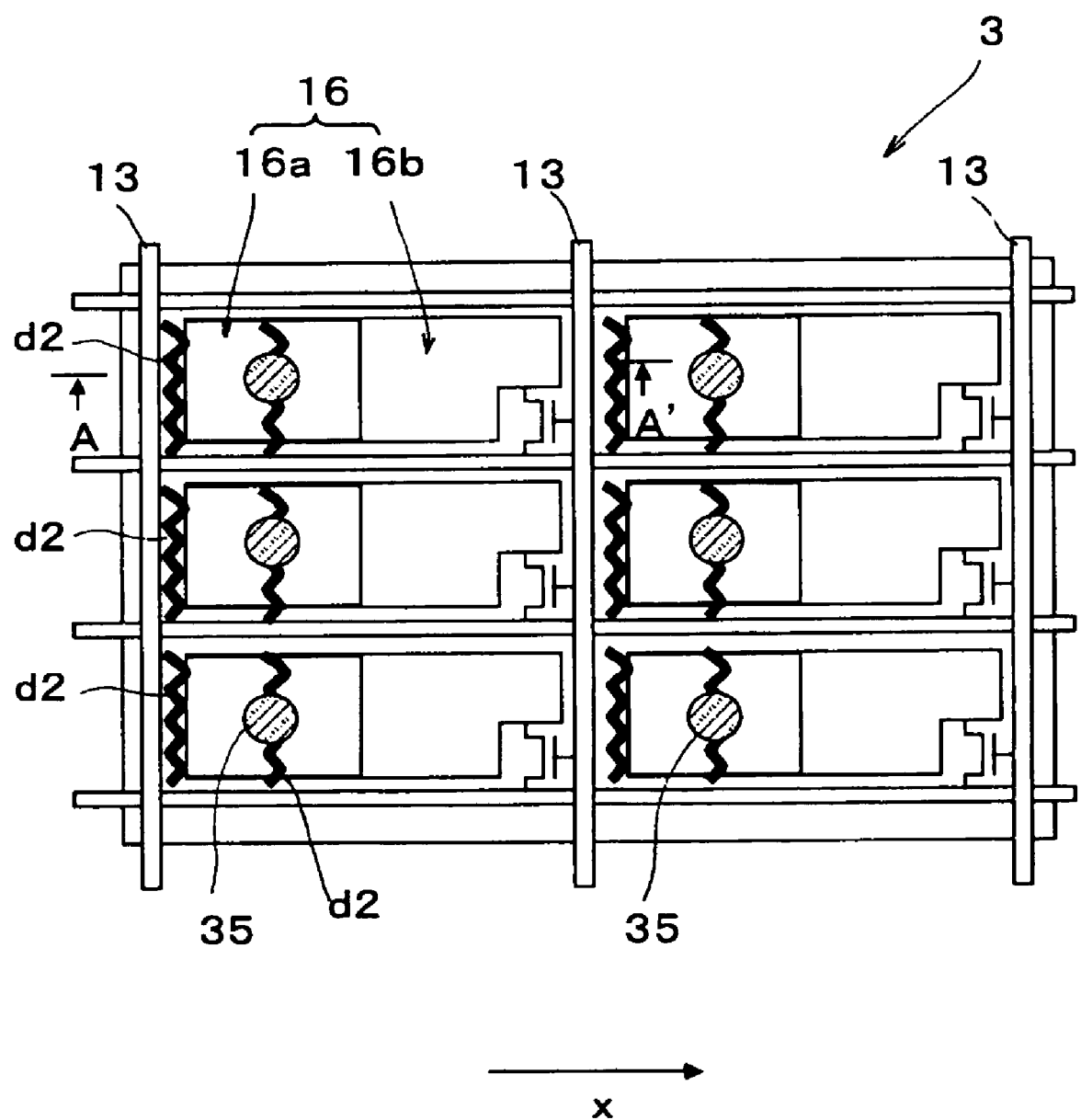
FIG. 2 illustrates movement of reverse-tilt domains in a liquid crystal panel according to the first embodiment of the present invention.

On the other hand, a reverse-tilt domain d2 is generated by a transverse electric field E between the pixel electrode 19 (reflective electrode component 19a) and the scanning line 13 perpendicular to the rubbing direction x. In a normal state, this reverse-tilt domain d2 is covered with a light-shielding mask provided along the scanning line 13. The light-shielding mask prevents light leakage. Referring now to FIG. 2, when the panel surface of the liquid crystal panel 3 is pressed, the reverse-tilt domains d2 move according to the flow of the liquid crystal layer 33 in the rubbing direction x. As described earlier, the liquid crystal panel 3 according to the first embodiment has the projection 35 at the center in the direction perpendicular to the rubbing direction x in each of the pixels 16. This projection 35 splits the reverse-tilt domain d2 which has moved toward the center of the pixel 16 in the rubbing direction x. Thus, light leakage from the reverse-tilt domain d2 which has moved toward the center of the pixel 16 is restricted to an unnoticeable level.

The projection 35 is provided adjacent to the start, instead of the center, in the rubbing direction x. This layout allows the reverse-tilt domain d2 which has moved toward the center of the pixel 16 in the rubbing direction x to be split at an earlier stage, i.e., at a position near the scanning line 13. Thus, the reverse-tilt domain d2 in each pixel 16 is prevented from continuously shifting toward the center (display area) of the pixel 16, consequently restricting light leakage from the reverse-tilt domain d2.

If two or more projections 35 arranged in each pixel 16 so as not to overlap each other in the rubbing direction x, they split the reverse-tilt domain d2 which has moved toward the center of the pixel 16 away from the scanning line 13 into more fractions. This layout further reduces light leakage from the reverse-tilt domain d2 in the pixel 16.

Referring to FIG. 1B, the liquid crystal panel 3 has the alignment film 21 controlled so that the liquid crystal molecules 33a have a pre-tilt angle θ of 4° to 20°. A pre-tilt angle θ of 4° or more reduces the movement of the reverse-tilt domains d2 in the rubbing direction x. In other words, it is difficult for a reverse-tilt domain d2 to reach the center (display area) of the corresponding pixel 16. Even if the domain d2 reaches the center of the pixel 16, it remains there for a short period of time only. Thus it reduces the period of time for which light leakage is noticeable. A pre-tilt angle θ of 20° or less suppresses retardation streaks specific to the rubbing method.

Furthermore each pixel 16 has the reflective display portion 16a and the transmissive display portion 16b arranged in that order in the rubbing direction x. Even if a reverse-tilt domain d2 moves toward the center of the corresponding pixel 16, the layout described above substantially prevents the domain d2 from reaching the transmissive display portion 16b, where light leakage is noticeable. Therefore, light leakage from the reverse-tilt domains d2 is reduced.

Consequently, the liquid crystal panel 3 according to the first embodiment of the present invention reduces light leakage from the reverse-tilt domains as much as possible and hence exhibits superior display characteristics. Accordingly, a display device with a touch panel including the liquid crystal panel 3 is capable of exhibiting superior display characteristics. For a display device having the liquid crystal panel 3 directly bonded with a touch panel (without providing a damping layer, i.e., a space), the liquid crystal panel 3 receives a stronger pressure on the panel surface. According to the first embodiment of the present invention, the display device is capable of maintaining superior display characteristics despite this stronger pressure.

The inventors performed an experiment to check for light leakage under the following conditions. Piezoelectric film touch panels were applied, with a glue, directly onto ECB-mode liquid crystal panels 3 including nematic liquid crystal composition with a birefringence Δn=0.1, a relative dielectric constant Δε=5 (25° C.), and a phase transition point of 90° C. The pre-tilt angle θ was set to 4° and to 5°. Then, the panel surface of each of the liquid crystal panels was pressed through the touch panel. As a result, no light leakage was noticeable. Thus, the liquid crystal panel exhibited superior display characteristics. Each of the above ECB-mode liquid crystal panels had a wideband circular-polarizer on the display surface of the counter substrate 31.

In the foregoing first embodiment, the liquid crystal panel 3 has (1) a projection 35 in each pixel 16, (2) a pre-tilt angle θ of the liquid crystal molecules of 4° or more, and (3) a reflective display portion 16a and a transmissive display portion 16b arranged in a predetermined state in each pixel 16. The liquid crystal panel according to the first embodiment may include only one or two of the features (1), (2) and (3) described above.

The liquid crystal panel according to the first embodiment can offer advantages corresponding to any one or two or all of the features (1), (2), and (3) implemented.

Figure 3:
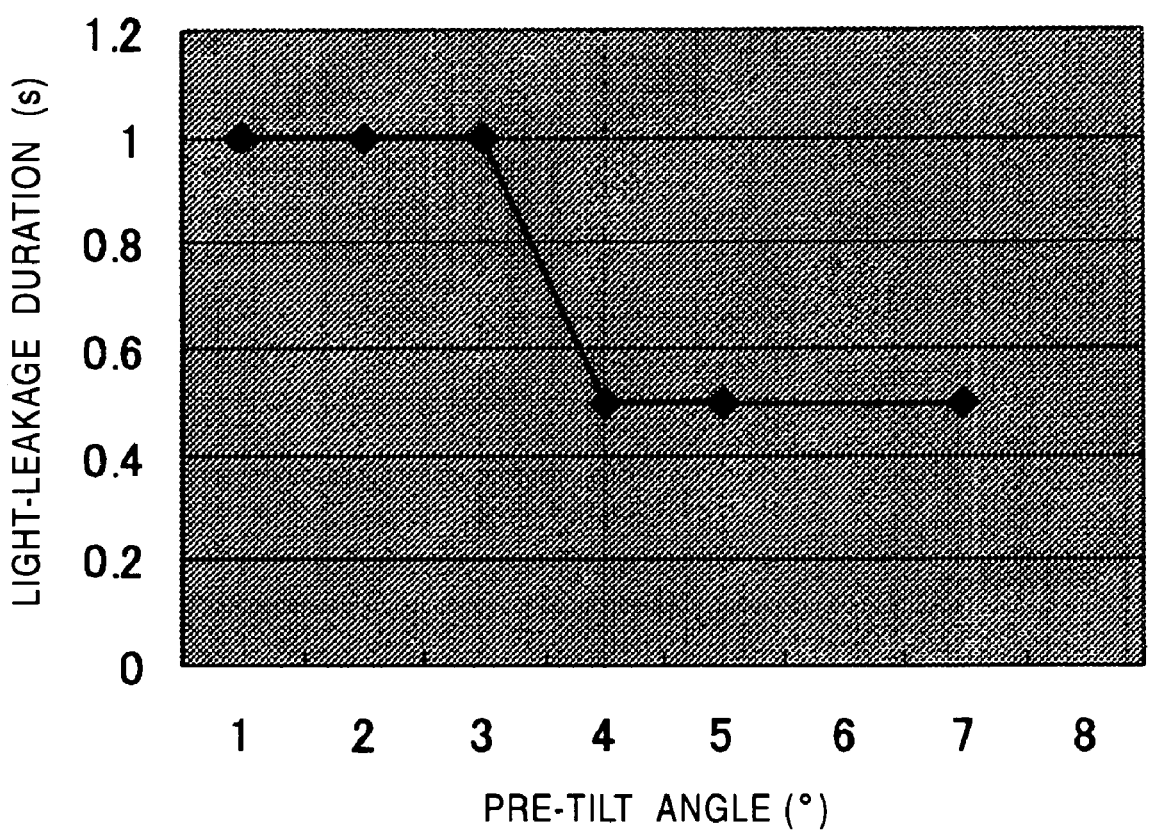
FIG. 3 is a graph showing the relationship between the pre-tilt angle θ for the alignment film and light-leakage duration in a liquid crystal panel.

For example, if the liquid crystal panel includes features (2) and (3), the panel can offer the foregoing advantages as a result of the liquid crystal molecules having a pre-tilt angle θ of 4° or more and the reflective display portions 16*a* and the transmissive display portions 16*b* being arranged in a predetermined state. FIG. 3 is a graph showing the relationship between the pre-tilt angle θ for the alignment film and light-leakage duration in the aforementioned ECB-mode liquid crystal panel (with no projection 35). The light-leakage duration is defined as the period of time from when visually noticeable light leakage occurs as a result of the touch panel being pressed to when the visually noticeable light leakage disappears.

Referring to FIG. 3, the light-leakage duration is about 1 s if the pre-tilt angle θ is less than 4°, whereas the light-leakage duration is reduced to 0.5 s if the pre-tilt angle θ is 4° or more. This indicates that the panel is advantageous in light of the present invention when the pre-tilt angle θ is set to 4° or more.

If the panel implements, for example, the features (1) and (3), the panel can offer the foregoing advantages as a result of the projections 35 being provided and the reflective display portions 16*a* and the transmissive display portions 16*b* being arranged in a predetermined state. The inventors performed an experiment using an ECB-mode liquid crystal panel under the following conditions: a pre-tilt angle θ=3°, projections 35 provided as shown in FIGS. 1A and 1B, and a touch panel provided on the liquid crystal panel. The light-leakage duration was 0.5 s when the touch panel of this liquid crystal panel was pressed.

Second Embodiment

Figure 4A:
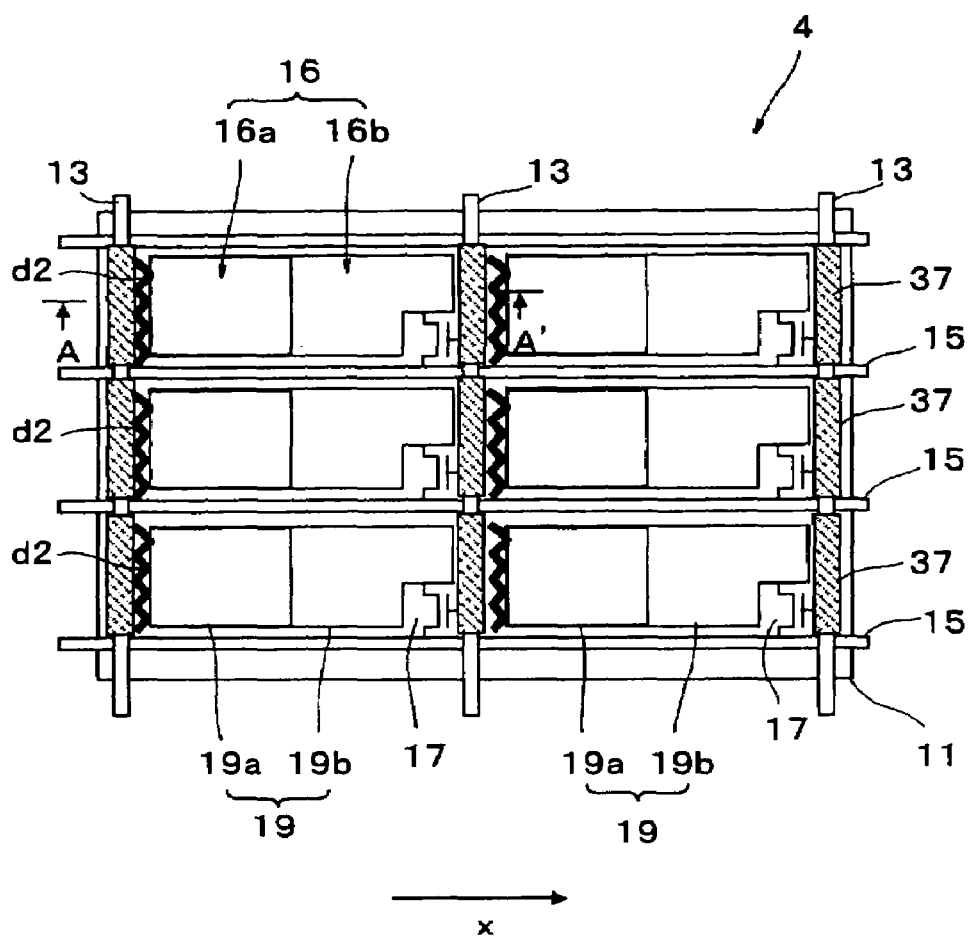
FIGS. 4A and 4B show schematic views of a liquid crystal panel according to a second embodiment of the present invention.
Figure 4B:
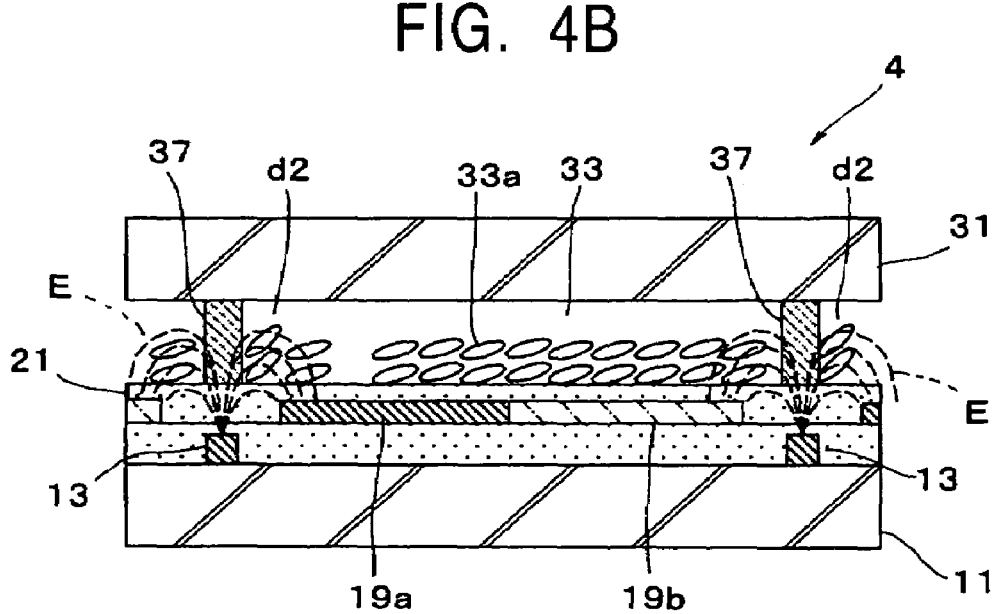
Figure 5:
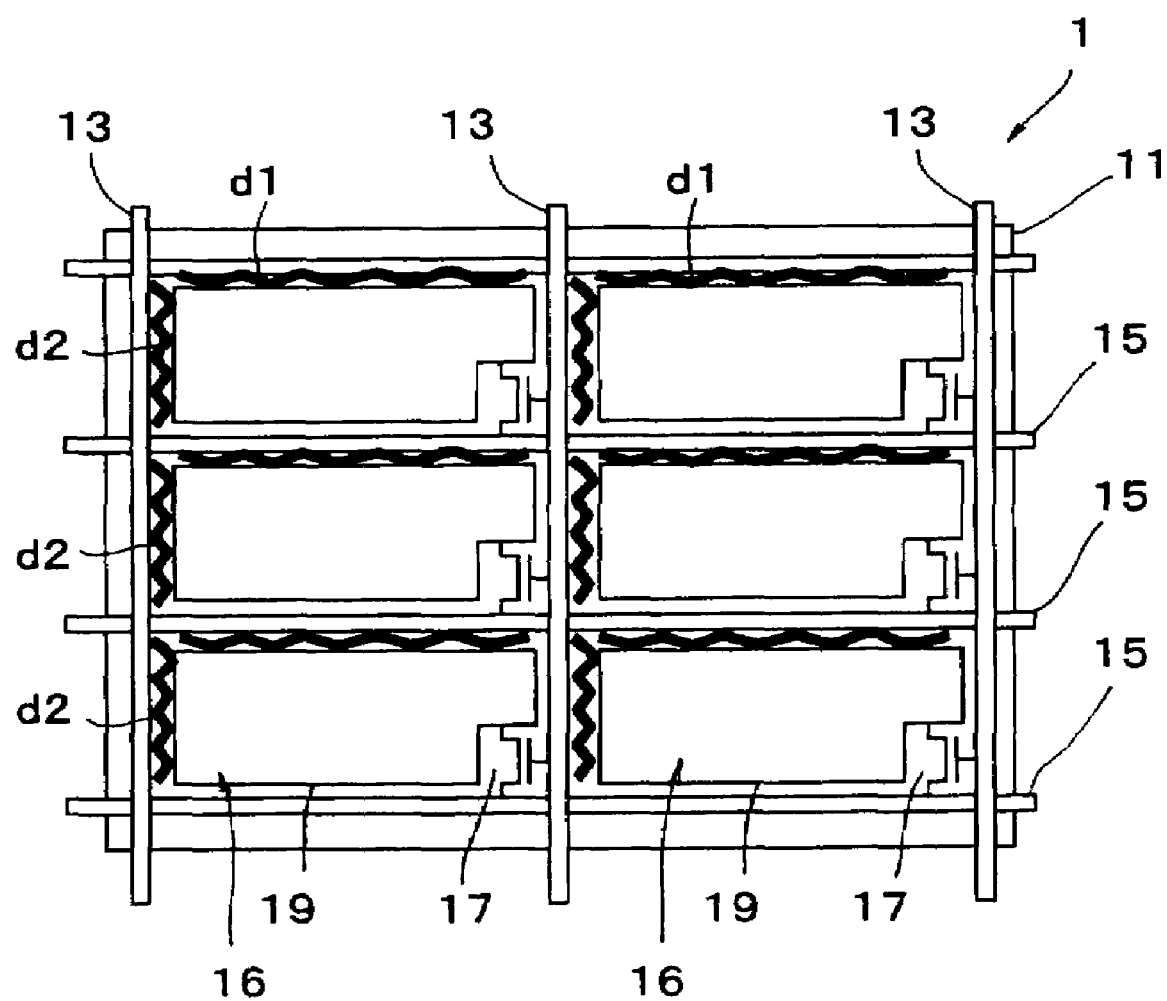
FIG. 5 is a schematic plan view of a conventional liquid crystal panel.

FIGS. 4A and 4B show schematic views of display areas of a liquid crystal panel 4 according to a second embodiment of the present invention. FIG. 4A is a schematic plan view of a driving substrate 11 included in the liquid crystal panel 4. FIG. 4B is a schematic sectional view of the liquid crystal panel 4, taken along line A-A' in FIG. 4A.

The liquid crystal panel 4 according to the second embodiment is the same as the liquid crystal panel 3 except that the liquid crystal panel 4 has walls 37 instead of the projections 35.

Referring to FIGS. 4A and 4B, the walls 37 are provided one in each of the pixels 16, such that the walls 37 extend along the borders between adjacent pixels 16 in the direction substantially perpendicular to the rubbing direction x. Thus, the walls 37 prevent the flow of a liquid crystal layer 33. In other words, each of the walls 37 is provided in the pixel 16 over the width of the pixel 16 in the direction of the scanning line 13, and substantially above the scanning line 13.

The walls 37 may be provided one in each of the pixels 16, as shown in FIG. 4A, if the walls 37 cover the width of the pixels 16 along the scanning line 13. Alternatively, one wall 37 may be provided so as to cover the entire length of the group of pixels 16 arranged along each of the scanning lines 13. As shown in FIG. 4B, the walls 37 are preferably provided at a height so as to serve as a spacer between the driving substrate 11 and the counter substrate 31.

The walls 37 are provided above or underneath the alignment film 21. Normally, the walls 37 are arranged underneath the alignment film 21, i.e., the surfaces of the walls 37 are covered with the alignment film 21. In this case, the walls 37 are formed of resist patterns by means of lithography over the driving substrate 11, the upper surface of which is then covered with the alignment film 21.

As with the liquid crystal panel 3 according to the first embodiment, the liquid crystal panel 4 according to the second embodiment can offer the foregoing advantages as a result of (2) the liquid crystal molecules 33*a* having a pre-tilt angle θ of 4° or more and (3) the reflective display portions 16*a* and the transmissive display portions 16*b* being arranged in a predetermined state.

In addition to the advantages associated with the features (2) and (3) above, the liquid crystal panel 4 according to the second embodiment offers another advantage as a result of (4) the walls 37 extending along the borders between adjacent pixels 16 in the direction substantially perpendicular to the rubbing direction x. That is, these walls 37 prevent the flow of the liquid crystal layer 33 in the rubbing direction x and therefore the movement of the reverse-tilt domains d2. Thus, even when the panel surface is pressed, the reverse-tilt domain d2 in each pixel 16 stays around the border of the pixel 16. Consequently, light leakage from the reverse-tilt domains d2 can be prevented in the display area.

As with the liquid crystal panel 3 according to the first embodiment, the liquid crystal panel 4 according to the second embodiment reduces light leakage from reverse-tilt domains as much as possible, thereby offering superior display characteristics. Therefore, a display device with a touch panel including the liquid crystal panel 4 is capable of exhibiting superior display characteristics, as with the first embodiment.

In the foregoing second embodiment, the liquid crystal panel 4 has (2) a pre-tilt angle θ of the liquid crystal molecules 33*a* of 40 or more, (3) the reflective display portions 16*a* and the transmissive display portions 16*b* arranged in a predetermined state in the pixels 16, and (4) the walls 37 extending along the borders between adjacent pixels 16 in the direction substantially perpendicular to the rubbing direction x. The liquid crystal panel 4 according to the second embodiment may include only one or two of the features (2), (3) and (4) described above.

The liquid crystal panel 4 according to the second embodiment can offer advantages corresponding to any one or two or all of the features (2), (3), and (4) implemented.

If the liquid crystal panel 4 implements, for example, features (3) and (4), the panel can offer the foregoing advantages as a result of the walls 37 extending along the borders between adjacent pixels 16 in the direction substantially perpendicular to the rubbing direction x and the reflective display portions 16*a* and the transmissive display portions 16*b* being arranged in a predetermined state. The inventors performed an experiment using an ECB-mode liquid crystal panel under the following conditions: a pre-tilt angle θ=3°, walls 37 provided as shown in FIGS. 4A and 4B, and a touch panel provided on the liquid crystal panel. The light leakage was not noticeable when the panel surface was pressed. Thus, the liquid crystal panel exhibited superior display characteristics.

The present invention has been described with reference to, but not limited to, the half-reflective and half-transmissive liquid crystal panels of the first and second embodiments; however, the present invention also offers the same advantages in reflective liquid crystal panels and transmissive liquid crystal panels. The present invention is more advantageous in liquid crystal panels with a transmissive display portion, where light leakage from a reverse-tilt domain is more noticeable.

The present invention covers liquid crystal panels having any combination of the features according to the first and second embodiments. In other words, the present invention covers all liquid crystal panels having at least one of the features (1) to (4) according to the first and second embodiments, and can offer the advantages of the features implemented.

What is claimed is:

1. A liquid crystal panel comprising:

a driving substrate;

pixels on a surface of the driving substrate, each of the pixels including a pixel electrode and a transistor connected to the pixel electrode;

signal lines and scanning lines connected to the transistors;

an alignment film rubbed in a direction substantially parallel to the signal lines or the scanning lines;

a counter substrate adjacent the alignment film;

a liquid crystal layer between the driving substrate and the counter substrate; and at least one projection provided in each of the pixels on the pixel electrode at a substantially central position, relative to two opposite boundaries of the corresponding pixel, the two opposite boundaries being parallel to the rubbing direction, the central position being adjacent to a starting position of the rubbing direction and to a boundary not being parallel to the rubbing direction.

2. The liquid crystal panel according to claim 1, wherein liquid crystal molecules of the liquid crystal layer have a pre-tilt angle of 4° to 20°.

3. The liquid crystal panel according to claim 1, wherein each of the pixels has a reflective display portion and a transmissive display portion provided in that order in the rubbing direction.

4. The liquid crystal panel according to claim 1, further comprising walls extending along the borders between adjacent pixels in a direction substantially perpendicular to the rubbing direction.

5. The liquid crystal panel according to claim 3, wherein the at least one projection is provided on the reflective display portion near a corresponding scanning line.

* * * * *